United States Patent [19]

Brunson

[11] Patent Number: 4,588,253

[45] Date of Patent: May 13, 1986

[54] INFRARED COLLIMATOR

[75] Inventor: Amber N. Brunson, Independence, Mo.

[73] Assignee: Brunson Instrument Company, Kansas City, Mo.

[21] Appl. No.: 613,304

[22] Filed: May 23, 1984

[51] Int. Cl.⁴ .............................................. G02B 27/30
[52] U.S. Cl. ............................... 350/1.1; 250/504 R; 350/620
[58] Field of Search .................. 350/1.1, 505, 620; 250/504 R, 496.1, 495.1, 504 H; 356/401

[56] References Cited

U.S. PATENT DOCUMENTS

| 3,211,910 | 10/1965 | Anderson | 250/493.1 |
| 3,219,827 | 11/1965 | Pittinger | 250/504 |
| 3,229,093 | 1/1966 | Trautvetter | 250/351 |
| 3,760,182 | 9/1973 | Poole | 250/492.1 |

FOREIGN PATENT DOCUMENTS 538622  8/1941  United Kingdom .

OTHER PUBLICATIONS

Model 271 Tilt Collimator (undated).
Cambion Differential Bipolar Temperature Controller Operations Manual, published by Midland Ross Corp. (undated).
Wetherell et al., "General Analysis of Aplanatic Casseguain, Gregorian, and Schwarzschild Telescopes", Applied Optics, vol. 11, No. 12, pp. 2817-2832, 1972.
Hannan, P. W., Microwave Antennaes Derived from the Casseguain Telescope", IRE Transactions on Antennaes and Propagation, vol. AP-9, No. 2, Mar. 1981, pp. 140-153.

Primary Examiner—Bruce Y. Arnold
Attorney, Agent, or Firm—Litman, Day and McMahon

[57] ABSTRACT

An infrared collimator uses a barrel and an infrared energy emitting source mounted at one end of the barrel. A reticle mask over the emission source produces a reticle beam pattern which is concentrated and collimated by a mirror assembly including a convex reflector mounted at a front end of the barrel and a concave concentrator with a central through bore and mounted in the barrel between the emission source and the convex reflector. The collimator produces infrared energy in a coherent, collimated beam pattern for instrument calibration and testing purposes.

2 Claims, 4 Drawing Figures

INFRARED COLLIMATOR

This invention relates to optical alignment and calibration devices and in particular to a collimator arrangement projecting a beam of coherent collimated energy for calibration and testing.

BACKGROUND OF THE INVENTION

Developments in the instrument field have shown a need for testing and calibration of instruments which sense, target track or otherwise reference from the source of heat or infrared (IR) spectrum energy. Such a testing and calibration instrument has heretofore not been made available in a collimator. Collimators have heretofore only produced visible spectrum energy to provide a coherent, collimated beam of visible light for reference and testing purposes. Some lasers are also used as calibration and testing instruments, however, lasers are not optical collimators and instead depend on crystal lattice excitement for uni-directional beam projection of various energy spectra. Moreover, particularly when simulating the IR emission characteristics of turbojet powered aerospace vehicles, lasers are often unsuitable because of the danger of working around the high intensity energy of a typical laser.

The present invention is an IR collimator which projects a beam of coherent, collimated heat energy. Intensity of the infrared radiation can be varied as desired in temperature for various calibration purposes. The collimator is a calibration instrument and while it performs no calibration function by itself, the projection beam is used as a reference beam by other instruments and sensors. The collimator device is a precision instrument and is relatively low in cost for the purpose.

OBJECTS OF THE INVENTION

The principal objects of the present invention are: to provide a collimator to project a beam of heat or infrared energy; to provide such a collimator in which the intensity of the IR energy can be varied; to provide such a collimator which finely maintains a set temperature; to provide such a collimator which projects a reticle pattern of heat energy; to provide such a collimator which is easily moved and transported to a job or calibration site; and to provide such a collimator which is relatively inexpensive, sturdy and efficient in use and particularly well adapted for the intended purpose.

Other objects and advantages of this invention will become apparent from the following description taken in conjunction with the accompanying drawings wherein are set forth, by way of illustration and example, certain embodiments of this invention.

DESCRIPTION OF THE PREFERRED EMBODIMENT

Figure 4:
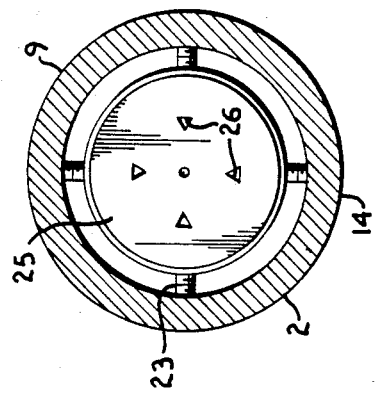
FIG. 4 is a cross-sectional view taken along lines 4—4, FIG. 2.
Figure 3:
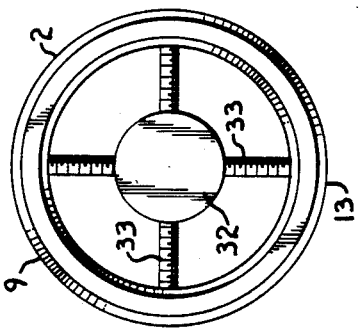
FIG. 3 is a front end elevational view of the collimator.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
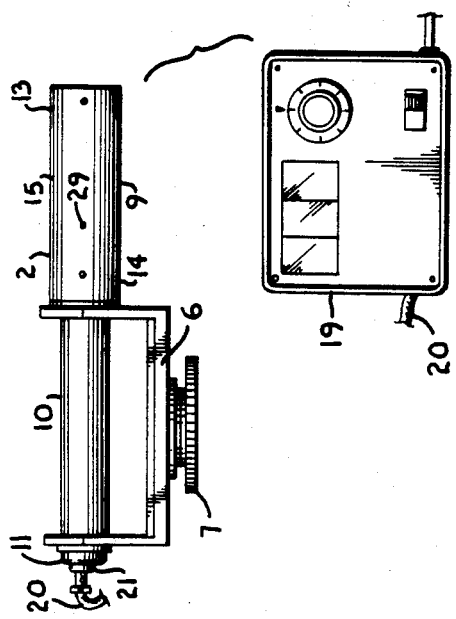
FIG. 1 is a perspective view of an infrared collimator embodying the present invention.
Figure 2:
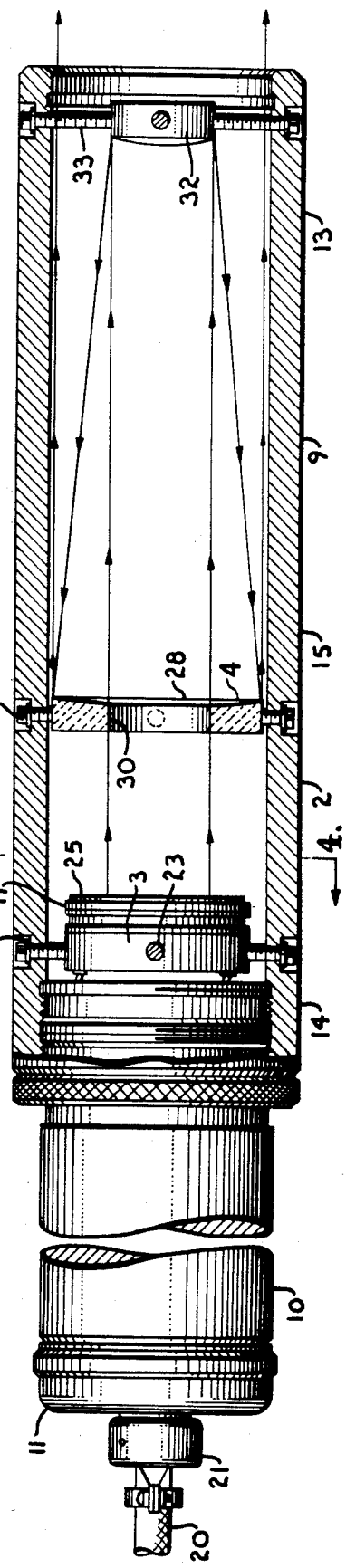
FIG. 2 is an enlarged, fragmentary, side elevational view of the collimator.

Referring to the drawings in more detail:

The reference numeral 1, FIGS. 1 and 2, designates a collimator instrument embodying the present invention. The collimator 1 includes a barrel 2 containing an infrared (IR) energy source 3, FIG. 2, mounted in the barrel 2 and a mirror assembly 4 also mounted in the barrel 2 and spaced from the IR source 3. Infrared energy from the source 3 is reflected by the mirror assembly 4 and directed outwardly of the barrel 2 in a coherent, collimated beam for calibration and testing by other instruments not of immediate interest.

In the illustrated example, FIG. 1, the collimator 1 is mounted upon a base assembly 6 which includes a screw head 7 for attachment to a tool bar, instrument stand or the like (not shown). The base assembly is preferably tiltable in elevation of the barrel 2 and includes various adjustment means for truing. In the illustrated example, the collimator barrel 2 is of a first section 9, FIGS. 1 and 2 and a second section 10. The first section 9 has inside the aforementioned IR source 3 and mirror assembly 4 and the second section 10 is of a size according with the base assembly 6. The second section 10 provides a rotation surface for the spaced yokes of the base assembly 6. The first section 9 is threadably connected to the second section 10 and extends outwardly from the base assembly 6. For balance, a counter weight 11 is positioned at the remote end of the barrel second section 10.

The first section 9 of the barrel 2 includes front and rear end portions 13 and 14, and a mid portion 15. The barrel 2 is cylindrical with a hollow interior. The IR source 3 is positioned generally within the rear end portion 14 and in the illustrated example is a bipolar temperature controller such as produced by the Cambion Division of Midland-Ross Corporation. The bipolar temperature controller is an automatic temperature controlling unit which includes a surface plate 17 which is heated by electrical resistance and may be maintained at an adjustable positive or negative differential in respect to a second reference temperature. Power to the IR source 3 is routed through a control unit 19, FIG. 1, which includes an internal transformer for AC to DC power conversion, an on/off switch, a temperature control dial, and a digital display providing a direct read-out of the temperature differential between the thermal electric device at the surface plate 17 and a second or reference temperature. The control unit 19 includes an external thermistor probe which usually senses normal room temperature or ambient temperature constituting the reference temperature. The temperature deviation between the temperature measured by the reference thermistor probe and the surface plate 17.

The control unit 19 is constructed so that once a specific temperature deviation has been set, the temperature differential will remain the same regardless of variations of the reference temperature.

An electrical line 20 extends from the control unit 19 to the IR source 3 and is routed through the barrel second section 10 and through a cable support 21, FIGS. 1 and 2. The IR source 3 is maintained within the barrel rear end portion 14 and centered or coaxially aligned by screw supports 23, FIG. 2.

A mask 25 is mounted over the surface plate 17 and imposes a reticle pattern on the IR energy emissions from the source 3. In the illustrated example, FIG. 4, the mask 3 provides an IR screen and has apertures 26 therethrough arranged in a four-point pattern about a center point coaxial with the longitudinal axis of the barrel 2. The apertures 26 are preferably cardinal points, i.e. located 90° from each other and oriented on vertical and horizontal axes.

The mirror assembly 4 is positioned in the barrel 2 and spaced from the IR source 3 so as to reflect and beam IR energy from the collimator 1. In the illustrated example, the mirror assembly 4 includes a concave concentrator mirror 28, which in the illustrated example is mounted midway of the barrel 2 and between the front and rear end portions 13 and 15. The concentrator mirror 28 is centered within the barrel bore by adjustment screws 29 and has a central through bore 30 of a diameter to match the periphery of the pattern of apertures 26 on the mask 25.

The second member of the mirror assembly 4 is a convex reflector mirror 32 mounted in the barrel front end portion 13 and coaxially centered by adjustment screws 33. The convex reflector mirror 32 is generally sized the same as the through bore 30 in the concave concentrator mirror 28. Accordingly, when IR energy is emitted from the source 3 in the form of a reticle beam pattern, many randomly directed beams are masked by the back side of the concentrator mirror 28. Relatively uni-directionally aligned beams are directed through the bore 30 and alignment is further refined by the impingement on the forward mounted convex reflector mirror 32. Further alignment and refinement of the beams takes place upon reflection from the convex reflector mirror 32 back to the concave concentrator mirror 28. Expansion of the reticle beam pattern occurs from reflection off of the convex reflector mirror 32 and the beam pattern is directed from the concentrator mirror 28 and out the open end of the collimator barrel 2.

Note the arrangement of the concave and convex mirrors 28 and 32 in the barrel 2 can be reversed and provide the same results. Although other types of optical systems may be utilized, the mirror type is preferred rather than attempting to pass the IR beams through a glass lens medium because of the insulative qualities of the glass.

It is to be understood that while certain forms of the present invention have been illustrated and described herein, it is not to be limited to the specific forms or arrangement of parts described and shown.

What is claimed and desired to be secured by Letters Patent is as follows:

1. An infrared collimator comprising:
   (a) a barrel housing having front and rear end portions;
   (b) an infrared energy emitting source mounted in the rear end portion of said barrel;
   (c) a mask over said source, said mask having apertures therethrough to produce a reticle beam pattern;
   (d) a mirror assembly including:
      (i) a concave concentrator having a central through bore and mounted coaxially in said barrel; and
      (ii) a convex reflector mounted coaxially in said barrel and sized approximately equal to said through bore;
   (e) whereby infrared energy in said reticle beam pattern is reflected respectively by said concave concentrator and said convex reflector and directed outwardly in a coherent, collimated beam through said barrel;
   (f) said source being an automatic temperature controlling unit having a resistance heated surface plate maintained at an adjustable differential with respect to a second reference temperature.

2. The infrared collimator set forth in claim 1 including:
   (a) a remote temperature display unit providing a readout of the temperature differential between said surface plate and said second reference temperature.

* * * * *